United States Patent
Unno et al.

(10) Patent No.: US 12,277,739 B2
(45) Date of Patent: Apr. 15, 2025

(54) POINT-CLOUD DECODING DEVICE, POINT-CLOUD DECODING METHOD, AND PROGRAM

(71) Applicant: KDDI CORPORATION, Tokyo (JP)

(72) Inventors: Kyohei Unno, Fujimino (JP); Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 362 days.

(21) Appl. No.: 17/958,271

(22) Filed: Sep. 30, 2022

(65) Prior Publication Data

US 2023/0091030 A1    Mar. 23, 2023

Related U.S. Application Data

(63) Continuation of application No. PCT/JP2021/006372, filed on Feb. 19, 2021.

(30) Foreign Application Priority Data

Mar. 30, 2020 (JP) ................................. 2020-061325

(51) Int. Cl.
*G06V 10/00* (2022.01)
*G06T 9/40* (2006.01)

(52) U.S. Cl.
CPC ............ *G06T 9/40* (2013.01); *G06T 2210/56* (2013.01)

(58) Field of Classification Search
CPC ....... G06T 9/40; G06T 9/001; G06T 2210/56; H04N 19/597; H04N 19/70; H04N 19/96
See application file for complete search history.

(56) References Cited

U.S. PATENT DOCUMENTS

| | | | | |
|---|---|---|---|---|
| 10,964,068 B2* | 3/2021 | Flynn | ........................ | G06T 9/20 |
| 10,964,102 B2* | 3/2021 | Vosoughi | .................. | G06T 7/37 |
| 11,200,703 B2* | 12/2021 | Kato | ........................ | H03M 7/30 |
| 11,373,338 B2* | 6/2022 | Faramarzi | ................. | G06T 9/00 |
| 11,381,840 B2* | 7/2022 | Zhang | .................... | H04N 19/70 |
| 11,611,775 B2* | 3/2023 | Gao | ..................... | H04N 19/119 |
| 11,615,557 B2* | 3/2023 | Flynn | ..................... | H04N 19/13 |
| | | | | 345/419 |
| 11,928,844 B2* | 3/2024 | Iguchi | ........................ | G06T 9/40 |

(Continued)

FOREIGN PATENT DOCUMENTS

| | | |
|---|---|---|
| WO | 2019/198636 A1 | 10/2019 |
| WO | 2019/240167 A1 | 12/2019 |
| WO | 2019/244931 A1 | 12/2019 |

OTHER PUBLICATIONS

Notice of Reasons for Refusal dated Mar. 28, 2023 with English translation, from corresponding JP Application No. 2020-061325.

(Continued)

*Primary Examiner* — Amir Alavi
(74) *Attorney, Agent, or Firm* — Troutman Pepper Locke LLP

(57) ABSTRACT

A point-cloud decoding device 200 according to the present invention includes: a geometry information decoding unit 2010 configured to decode a flag that controls whether to apply "Implicit QtBt" or not; and an attribute-information decoding unit 2060 configured to decode a flag that controls whether to apply "scalable lifting" or not; wherein, a restriction is set not to apply the "scalable lifting" when the "Implicit QtBt" is applied.

4 Claims, 17 Drawing Sheets

(56) References Cited

U.S. PATENT DOCUMENTS

| | | | | |
|---|---|---|---|---|
| 11,979,605 | B2* | 5/2024 | Wang | H04N 19/184 |
| 12,069,302 | B2* | 8/2024 | Boyce | G06V 10/761 |
| 2021/0021869 | A1 | 1/2021 | Wang et al. | |
| 2021/0092417 | A1 | 3/2021 | Sugio | |
| 2021/0105458 | A1 | 4/2021 | Sugio et al. | |
| 2021/0407149 | A1* | 12/2021 | Iguchi | G06T 9/40 |
| 2022/0109826 | A1 | 4/2022 | Sugio et al. | |
| 2023/0091030 | A1* | 3/2023 | Unno | H04N 19/70 |
| | | | | 382/240 |

OTHER PUBLICATIONS

Extended European Search Report dated Jul. 20, 2023, from corresponding European Application No. 21779348.8.

Hyejung Hur et al., "[G-PCC][New Proposal] on improved spatial scalable lifting", 128 MPEG Meeting; Oct. 7, 2019-Oct. 11, 2019; Geneva, CH; Motion Picture Expert Group or ISO/IEC JTC1/SC29/WG11, No. m51408, Oct. 7, 2019, XP030221738.

Implicit Geometry Partition for Point Cloud Compression; by Xiang Zhang et al.; 2020 Data Compression Conference (DCC); Mar. 24, 2020; pp. 73-82.

[G-PCC] Editorial input on G-PCC draft text: ISO/IEC; JTC1/SC29/WG11, m51806.

G-PCC codec description V5; ISO/IEC; JTC1/SC29/WG11; N18891.

* cited by examiner

FIG. 4

| geometry_parameter_set(){ | Descriptor |
|---|---|
| gps_geom_parameter_set_id | ue(v) |
| ... | |
| gps_max_log2_node_size | ue(v) |
| gps_implicit_geom_partition_flag | u(1) |
| if(gps_implicit_geom_partition_flag){ | |
| gps_max_diff_log2_node_size | ue(v) |
| gps_max_num_implicit_qtbt_before_ot | ue(v) |
| gps_min_size_implicit_qtbt | ue(v) |
| } | |
| ... | |
| } | |

FIG. 5

| geometry_slice_header() { | Descriptor |
|---|---|
|   gsh_geometry_parameter_set_id | ue(v) |
|   ... | |
|   if ( gps_implicit_geom_partition_flag) { | |
|     gsh_implicit_geom_partition_flag | u(1) |
|     if ( gsh_implicit_geom_partition_flag) { | |
|       gsh_log2_max_nodesize_x | ue(v) |
|       gsh_log2_max_nodesize_y_minus_x | se(v) |
|       gsh_log2_max_nodesize_z_minus_y | se(v) |
|     } | |
|   } | |
|   if (gsh_implicit_geom_partition_flag) { | |
|     gsh_log2_max_nodesize | ue(v) |
|   } | |
|   ... | |
| } | |

FIG. 8B
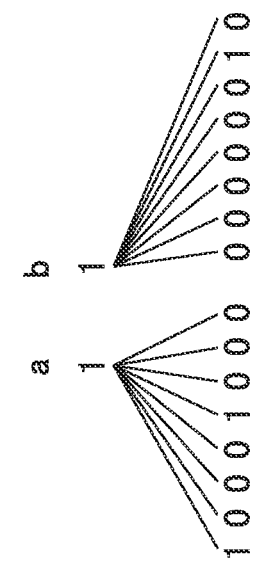
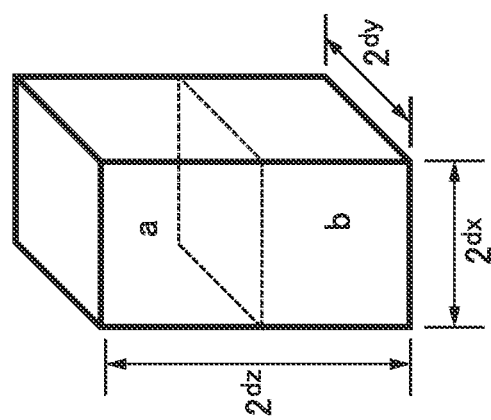

FIG. 11

| attribute_parameter_set( ) { | Descriptor |
|---|---|
|    aps_attr_parameter_set_id | ue(v) |
|    aps_seq_parameter_set_id | ue(v) |
|    attr_coding_type | ue(v) |
|    ... | |
|    if ( attr_coding_type == 2 ) | |
|       lifting_scalability_enabled_flag | u(1) |
|    ... | |
|    byte_alignment( ) | |
| } | |

FIG. 13C

Morton Code

◯ : (2, 4) → 10 01 00
● : (3, 4) → 10 01 01
● : (3, 5) → 10 01 11

10 01 11 :
$x = 0 \times 2^2 + 1 \times 2^1 + 1 \times 2^0 = 3$
$y = 1 \times 2^2 + 0 \times 2^1 + 1 \times 2^0 = 5$ Partition-based Code

◯ : (2, 4) → 11 00 00
● : (3, 4) → 11 01 00
● : (3, 5) → 11 01 10

11 01 10 :
$x = 1 \times 2^1 + 1 \times 2^0 + 0 \times 2^0 = 3$
$y = 1 \times 2^2 + 0 \times 2^1 + 1 \times 2^0 = 5$

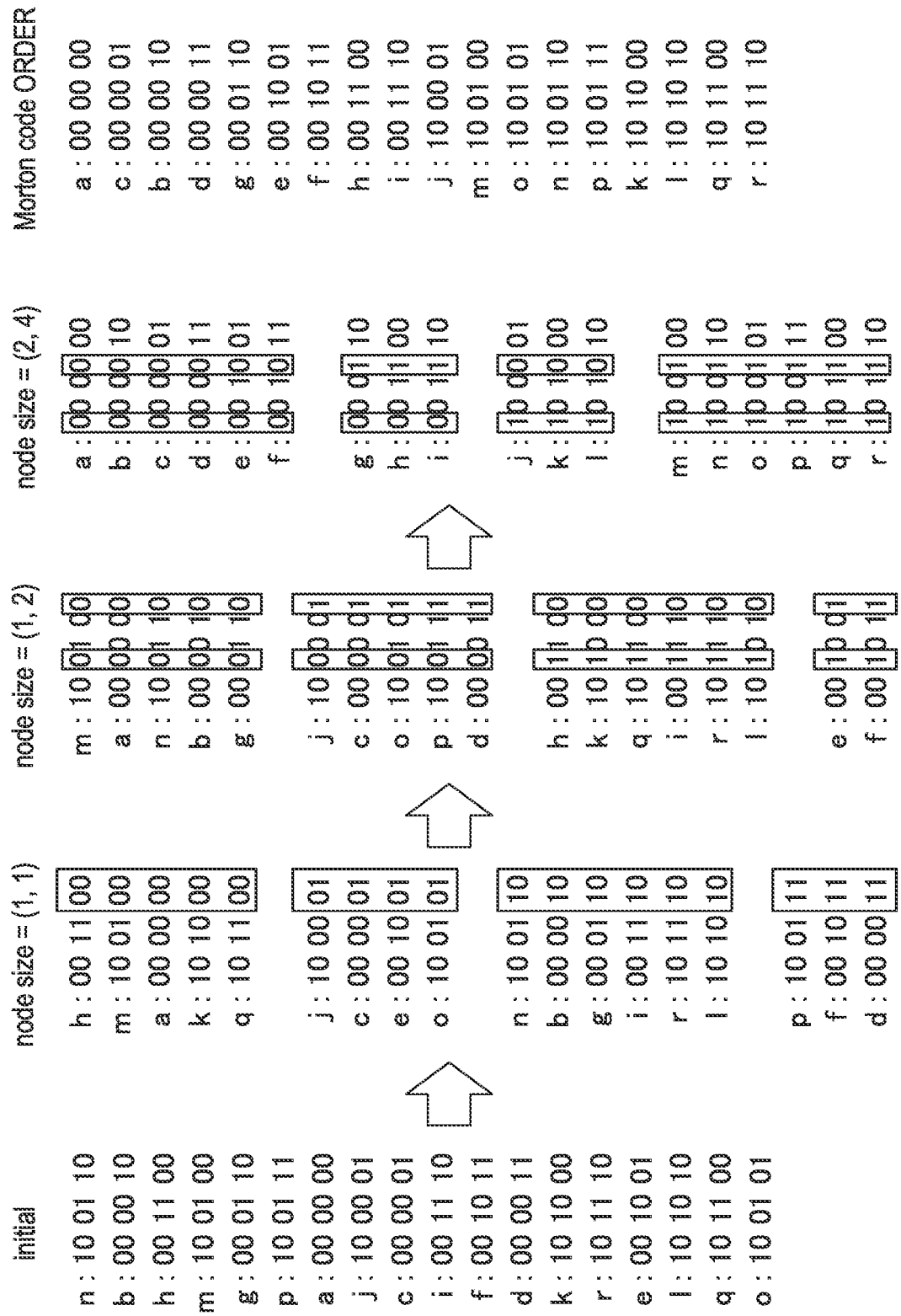

FIG. 15
parent node size = (1, 2)
a : 00 00 00
b : 00 00 10
c : 00 00 01
d : 00 00 11
e : 00 10 01
f : 00 10 11
g : 00 01 10
h : 00 11 00
i : 00 11 10
j : 10 00 01
k : 10 10 00
l : 10 10 10
m : 10 01 00
n : 10 01 10
o : 10 01 01
p : 10 01 11
q : 10 11 00
r : 10 11 10
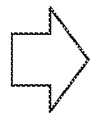
parent node size = (2, 4)
a : 00 00 00
c : 00 00 01
e : 00 10 01
g : 00 01 10
h : 00 11 00
j : 10 00 01
k : 10 10 00
m : 10 01 00
o : 10 01 01
q : 10 11 00
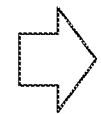
parent node size = (4, 8)
e : 00 10 01
h : 00 11 00
k : 10 10 00
q : 10 11 00

POINT-CLOUD DECODING DEVICE, POINT-CLOUD DECODING METHOD, AND PROGRAM

CROSS-REFERENCE TO RELATED APPLICATIONS

The present application is a continuation based on PCT Application No. PCT/JP2021/006372, filed on Feb. 19, 2021, which claims the benefit of Japanese patent application No. 2020-061325, filed on Mar. 30, 2020. The content of all of which are incorporated by reference herein in their entirety.

TECHNICAL FIELD

The present invention relates to a point-cloud decoding device, a point-cloud decoding method, and a program.

BACKGROUND ART

Editorial input on G-PCC draft text, ISO/IEC, JTC1/SC29/WG11, m51806 and G-PCC codec description V5, ISO/IEC, JTC1/SC29/WG11, N18891 disclose techniques which decode position information of point clouds by recursively carrying out octree division, quadtree division, and binary tree division.

SUMMARY OF INVENTION

However, inventors of the present application have found problems that Editorial input on G-PCC draft text, ISO/IEC, JTC1/SC29/WG11, m51806 and G-PCC codec description V5, ISO/IEC, JTC1/SC29/WG11, N18891 do not define restrictions on the size of an initial node when the above described division is carried out.

Therefore, the present invention has been accomplished in view of the above described problem, and it is an object of the present invention to provide a point-cloud decoding device, a point-cloud decoding method, and a program capable of facilitating designing by enabling definition of the restriction on the size of the initial node when the division is to be carried out.

The first aspect of the present invention is summarized as a point-cloud decoding device including: a geometry information decoding unit configured to decode a syntax defining a maximum value of an initial node size.

The second aspect of the present invention is summarized as a point-cloud decoding device including: a geometry information reconfiguration unit configured to cause position information of each point to be one-dimensional arrayed data, and, output the arrayed data in a state in which data of the points belonging to the same parent node is arranged to be adjacent to each other, as the order of the arrayed data.

The third aspect of the present invention is summarized as a point-cloud decoding device including: a geometry information decoding unit configured to decode a flag that controls whether to apply "Implicit QtBt" or not; and an attribute-information decoding unit configured to decode a flag that controls whether to apply "scalable lifting" or not; wherein, a restriction is set not to apply the "scalable lifting" when the "Implicit QtBt" is applied.

The fourth aspect of the present invention is summarized as a point-cloud decoding device including: a tree synthesizing unit configured to decode data of each point by dividing an initial node recursively, and a LoD calculation unit configured to calculate Morton Codes from coordinates of each point and sort position information data of the points by referencing bits of Morton Codes corresponding to node sizes in the division process.

The fifth aspect of the present invention is summarized as a point-cloud decoding device including: a tree synthesizing unit configured to decode data of each point by dividing an initial node recursively, and a LoD calculation unit configured to calculate, for each point and for every single division process, code which always generates bits corresponding to x-, y-, and z-axes and sorts position information data of the points in the code order.

The sixth aspect of the present invention is summarized as a point-cloud decoding method including processes of: decoding a syntax defining a maximum value of an initial node size.

The seventh aspect of the present invention is summarized as a program used in a point-cloud decoding device, the program causing a computer to execute processes of: decoding a syntax defining a maximum value of an initial node size.

Advantageous Effects of Invention

According to the present invention, it is possible to provide a point-cloud decoding device, a point-cloud decoding method, and a program capable of facilitating designing by enabling definition of the restriction on the size of the initial node when the division is to be carried out.

BRIEF DESCRIPTION OF DRAWINGS

FIG. 4 is an example of a syntax configuration of GPS 2011 according to the embodiment.

FIG. 5 is an example of a syntax configuration of GSH 2012A/2012B according to the embodiment.

FIGS. 8A-8B are diagrams for describing an example of a process of the tree synthesizing unit 2020 of the point-cloud decoding device 200 according to the embodiment.

FIG. 11 is an example of a syntax configuration of APS 2061 according to the embodiment.

FIGS. 13A-13C are diagrams for describing an example of a process of the LOD calculation unit 2090 of the point-cloud decoding device 200 according to the embodiment.

FIG. 14 is a diagram for describing an example of a process of the LoD calculation unit 2090 of the point-cloud decoding device 200 according to the embodiment.

FIG. 15 is a diagram for describing an example of a process of the LoD calculation unit 2090 of the point-cloud decoding device 200 according to the embodiment.

DESCRIPTION OF EMBODIMENTS

An embodiment of the present invention will be explained hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
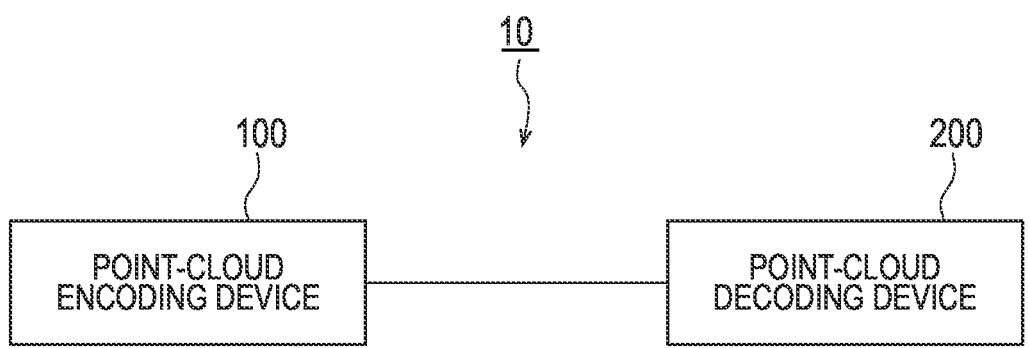
FIG. 1 is a diagram illustrating an example of a configuration of a point-cloud processing system 10 according to an embodiment.

Hereinafter, with reference to FIG. 1 to FIG. 8B, a point-cloud processing system 10 according to a first embodiment of the present invention will be described. FIG. 1 is a diagram illustrating the point-cloud processing system 10 according to an embodiment according to the present embodiment.

As illustrated in FIG. 1, the point-cloud processing system 10 has a point-cloud encoding device 100 and a point-cloud decoding device 200.

The point-cloud encoding device 100 is configured to generate encoded data (bit stream) by encoding input point-cloud signals. The point-cloud decoding device 200 is configured to generate output point-cloud signals by decoding the bit stream.

Note that the input point-cloud signals and the output point-cloud signals include position information and attribute information of points in point clouds. The attribute information is, for example, color information or a reflection ratio of each point.

Herein, the bit stream may be transmitted from the point-cloud encoding device 100 to the point-cloud decoding device 200 via a transmission path. The bit stream may be stored in a storage medium and then provided from the point-cloud encoding device 100 to the point-cloud decoding device 200.

(Point-Cloud Decoding Device 200)

Figure 2:
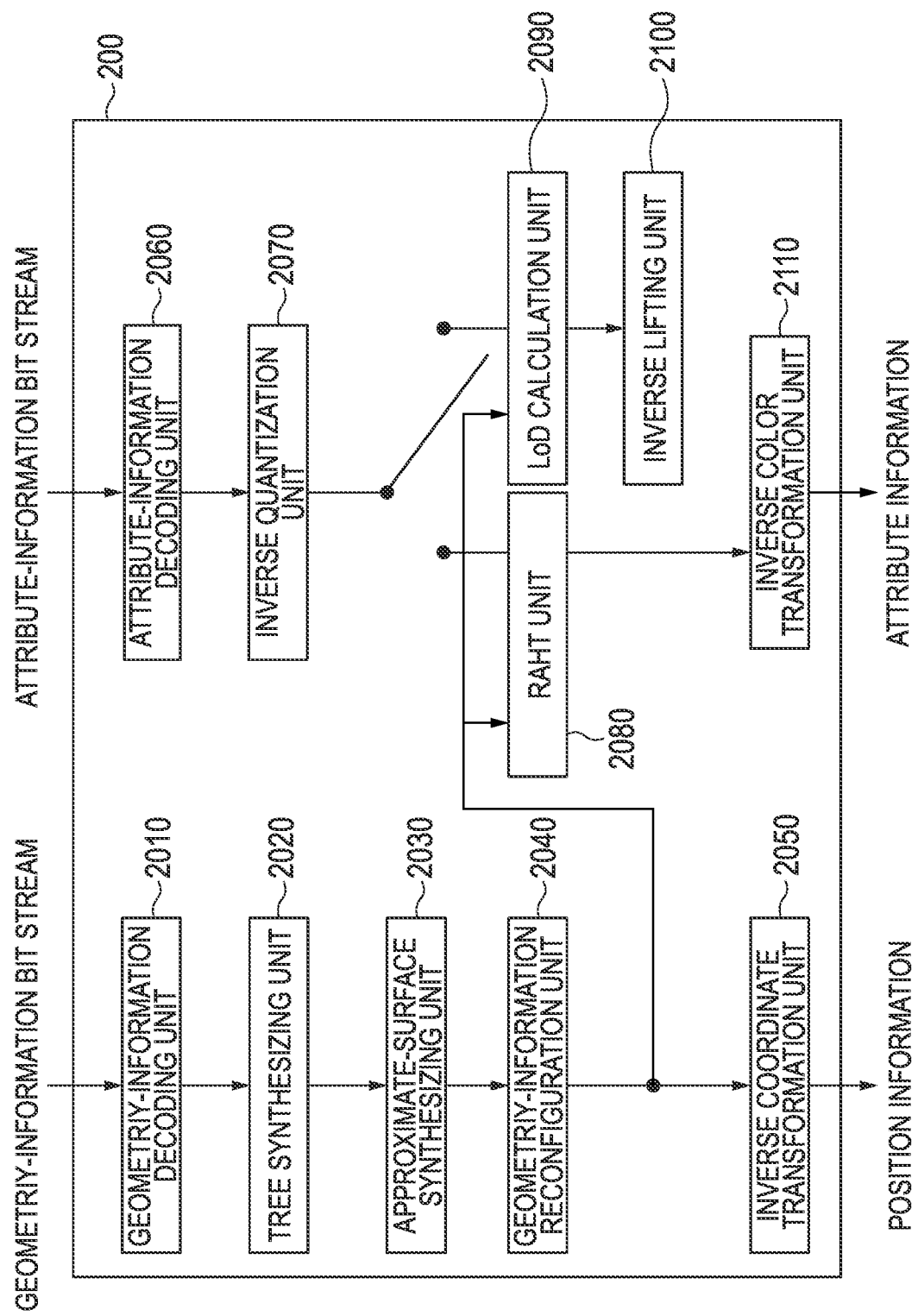
FIG. 2 is a diagram illustrating an example of functional blocks of a point-cloud decoding device 200 according to the embodiment.

Hereinafter, with reference to FIG. 2, the point-cloud decoding device 200 according to the present embodiment will be described. FIG. 2 is a diagram illustrating an example of functional blocks of the point-cloud decoding device 200 according to the present embodiment.

As illustrated in FIG. 2, the point-cloud decoding device 200 has a geometry information decoding unit 2010, a tree synthesizing unit 2020, an approximate-surface synthesizing unit 2030, a geometry information reconfiguration unit 2040, an inverse coordinate transformation unit 2050, an attribute-information decoding unit 2060, an inverse quantization unit 2070, a RAHT unit 2080, a LoD calculation unit 2090, an inverse lifting unit 2100, and an inverse color transformation unit 2110.

The geometry information decoding unit 2010 is configured to use, as input, a bit stream about geometry information (geometry information bit stream) among bit streams output from the point-cloud encoding device 100 and to decode syntax.

A decoding process is, for example, a context-adaptive binary arithmetic decoding process. Herein, for example, the syntax includes control data (flags and parameters) for controlling the decoding process of the position information.

The tree synthesizing unit 2020 is configured to use, as input, control data, which has been decoded by the geometry information decoding unit 2010, and later-described occupancy code that shows on which nodes in a tree a point cloud is present and to generate tree information about in which regions in a decoding target space points are present.

The present process can generate the tree information by recursively repeating a process of sectioning the decoding target space by cuboids, determining whether the points are present in each cuboid by referencing the occupancy code, dividing the cuboid in which the points are present into plural cuboids, and referencing the occupancy code.

In the present embodiment, there can be used a method called "Octree" in which octree division is recursively carried out while the above described cuboids are always cubes and a method called "Implicit QtBt" in which an initial size of the cuboids is specified by the control data, and octree, quadtree, and binary tree division is adaptively carried out based on the size of the cuboids and the parameters in the control data. Which method to be used is transmitted as the control data from the point-cloud encoding device 100 side.

The approximate-surface synthesizing unit 2030 is configured to generate approximate-surface information by using the tree information generated by the tree synthesizing unit 2020.

In a case where point clouds are densely distributed on a surface of an object, for example, when three-dimensional point-cloud data of the object is to be decoded, the approximate-surface information approximates and expresses the region in which the point clouds are present by a small flat surface instead of decoding the individual point clouds.

Specifically, the approximate-surface synthesizing unit 2030 can generate the approximate-surface information, for example, by a method called "Trisoup". As specific processes of "Trisoup", for example, the methods described in Non Patent Literatures 1 and 2 can be used. When sparse point-cloud data acquired by Lidar or the like is to be decoded, the present process can be omitted.

The geometry information reconfiguration unit 2040 is configured to reconfigure the geometry information of each point of the decoding-target point cloud (position information in a coordinate system assumed by the decoding process) based on the tree information generated by the tree synthesizing unit 2020 and the approximate-surface information generated by the approximate-surface synthesizing unit 2030.

The inverse coordinate transformation unit 2050 is configured to use the geometry information, which has been reconfigured by the geometry information reconfiguration unit 2040, as input, to transform the coordinate system assumed by the decoding process to a coordinate system of the output point-cloud signals, and to output the position information.

The attribute-information decoding unit 2060 is configured to use, as input, a bit stream about the attribute information (attribute-information bit stream) among bit streams output from the point-cloud encoding device 100 and to decode syntax.

A decoding process is, for example, a context-adaptive binary arithmetic decoding process. Herein, for example, the syntax includes control data (flags and parameters) for controlling the decoding process of the attribute information.

The attribute-information decoding unit 2060 is configured to decode quantized residual information from the decoded syntax.

The inverse quantization unit 2070 is configured to carry out an inverse quantization process and generate inverse-quantized residual information based on quantized residual information decoded by the attribute-information decoding unit 2060 and a quantization parameter which is part of the control data decoded by the attribute-information decoding unit 2060.

The inverse-quantized residual information is output to either one of the RAHT unit 2080 and LoD calculation unit 2090 depending on characteristics of the point cloud serving as a decoding target. The control data decoded by the attribute-information decoding unit 2060 specifies to which one the information is to be output.

The RAHT unit 2080 is configured to use, as input, the inverse-quantized residual information generated by the inverse quantization unit 2070 and the geometry information generated by the geometry information reconfiguration unit 2040 and to decode the attribute information of each point by using one type of Haar transformation (in a decoding process, inverse Haar transformation) called Region Adaptive Hierarchical Transform (RAHT). As specific processes of RAHT, for example, the methods described in Non Patent Literatures 1 and 2 can be used.

The LOD calculation unit 2090 is configured to use the geometry information, which has been generated by the geometry information reconfiguration unit 2040, as input and to generate Level of Detail (LoD).

LoD is the information for defining a reference relation (referencing point and point to be referenced) for realizing prediction encoding which predicts, from the attribute information of a certain point, the attribute information of another point and encodes or decodes prediction residual.

In other words, LoD is the information defining a hierarchical structure which categorizes the points included in the geometry information into plural levels and encodes or decodes the attributes of the point belonging to a lower level by using the attribute information of the point which belongs to a higher level.

As specific methods of determining LOD, for example, the methods described in Editorial input on G-PCC draft text, ISO/IEC, JTC1/SC29/WG11, m51806 and G-PCC codec description V5, ISO/IEC, JTC1/SC29/WG11, N18891 may be used. Other examples will be described later.

The inverse lifting unit 2100 is configured to decode the attribute information of each point based on the hierarchical structure defined by LoD by using the LoD generated by the LOD calculation unit 2090 and the inverse-quantized residual information generated by the inverse quantization unit 2070. As specific processes of the inverse lifting, for example, the methods described in Editorial input on G-PCC draft text, ISO/IEC, JTC1/SC29/WG11, m51806 and G-PCC codec description V5, ISO/IEC, JTC1/SC29/WG11, N18891 can be used.

The inverse color transformation unit 2110 is configured to subject the attribute information, which is output from the RAHT unit 2080 or the inverse lifting unit 2100, to an inverse color transformation process when the attribute information of the decoding target is color information and when color transformation has been carried out on the point-cloud encoding device 100 side. Whether to execute the inverse color transformation process or not is determined by the control data decoded by the attribute-information decoding unit 2060.

The point-cloud decoding device 200 is configured to decode and output the attribute information of each point in the point cloud by the above described processes.

(Geometry information Decoding Unit 2010)

Hereinafter, the control data decoded by the geometry information decoding unit 2010 will be described by using FIG. 3 to FIG. 5.

Figure 3:
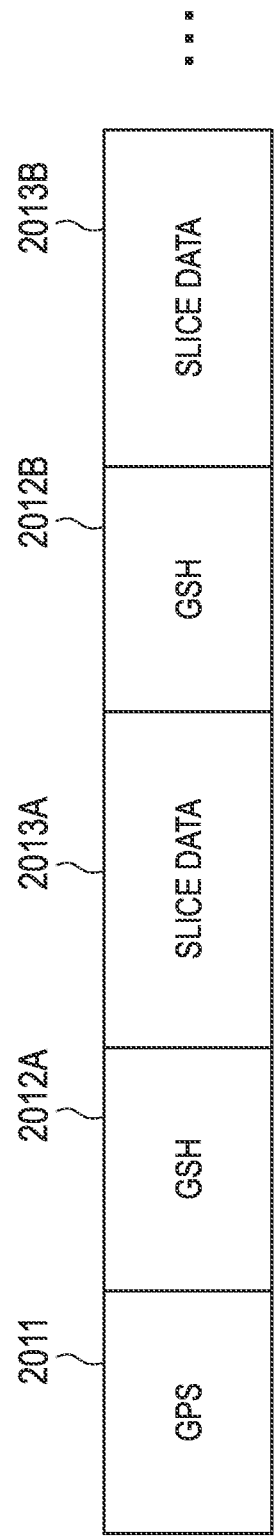
FIG. 3 is a configuration example of encoded data (bit stream) received by a geometry information decoding unit 2010 of the point-cloud decoding device 200 according to the embodiment.

FIG. 3 is a configuration example of the encoded data (bit stream) received by the geometry information decoding unit 2010.

First, the bit stream may include GPS 2011. The GPS 2011 is also called a geometry parameter set and is an aggregate of the control data about decoding of geometry information. A specific example will be described later. Each GPS 2011 includes at least GPS id information for individual identification in a case where plural pieces of GPS 2011 are present.

Secondly, the bit stream may include GSH 2012A/2012B. The GSH 2012A/2012B are also called geometry slice headers and are aggregates of the control data corresponding to later-described slices. A specific example will be described later. The GSH 2012A/2012B includes at least GPS id information for specifying the GPS 2011 corresponding to the GSH 2012A/2012B, respectively.

Thirdly, the bit stream may include slice data 2013A/2013B subsequent to the GSH 2012A/2012B. The slice data 2013A/2013B includes encoded data of geometry information. An example of the slice data 2013A/2013B is later-described occupancy code.

As described above, the bit stream is configured so that the respective GSH 2012A/2012B and the GPS 2011 correspond to each slice data 2013A/2013B.

As described above, since which GPS 2011 is to be referenced is specified by the GPS id information in the GSH 2012A/2012B, the common GPS 2011 can be used for the plural pieces of slice data 2013A/2013B.

In other words, the GPS 2011 is not always required to be transmitted for each slice. For example, the bit stream can be configured so that the GPS 2011 is not encoded immediately anterior to the GSH 2012B and the slice data 2013B like FIG. 3.

Note that the configuration of FIG. 3 is merely an example. As long as the GSH 2012A/2012B and the GPS 2011 are configured to correspond to each slice data 2013A/2013B, an element(s) other than those described above may be added as a constituent element(s) of the bit stream. For example, the bit stream may include a sequence parameter set (SPS). Similarly, for transmission, the bit stream may be formed into a configuration different from that of FIG. 3. Furthermore, the bit stream may be synthesized with the bit stream, which is decoded by the later-described attribute-information decoding unit 2060, and transmitted as a single bit stream.

FIG. 4 is an example of a syntax configuration of the GPS 2011.

The GPS 2011 may include GPS id information (gps_geom_parameter_set_id) for identifying each GPS 2011.

The GPS 2011 may include syntax (gps_max_log 2_node_size) defining a maximum node size (maximum value of an initial node size) of a later-described tree. It may be defined that gps_max_log 2_node_size always has a value of "0" or higher. For example, gps_max_log 2_node_size may be encoded by unsigned 0-exponent Golomb coding.

Note that a Descriptor section of FIG. 4 means a way how each syntax is encoded. An unsigned 0-exponent Golomb code is represented by ue(v), and a 1-bit flag is represented by u(1).

The GPS 2011 can define the maximum value of the possible value of the later-described syntax by including gps_max_log 2_node_size defining the maximum node size.

Since the GPS 2011 is provided with gps_max_log 2_node_size, the maximum value which can be set as gps_max_log 2_node_size can be defined in specifications called a profile or a level, and the maximum value of the node size to be supported by performance or applications can be easily specified.

The GPS 2011 may include a flag (gps_implicit_geom_partition_flag) for controlling whether to carry out "Implicit QtBt" by the tree synthesizing unit 2020 or not. For example, it may be defined that, when the value of gps_implicit_geom_partition_flag is "1", "Implicit QtBt" is carried out, and it may be defined that, when the value of gps_implicit_geom_partition_flag is "0", "Octree" that only carries out octree division which always uses nodes of a tree as cubes.

Note that, when the value of gps_implicit_geom_partition_flag is "1", the GPS 2011 may additionally include control data about "Implicit QtBt".

The GPS 2011 may be provided with a maximum value (gps_max_diff_log 2_node_size) of the difference between the maximum value and the minimum value of the initial node size in each of an x-axis, a y-axis, and a z-axis direction as the control data about "Implicit QtBt".

A case where the difference (the value of gps_max_diff_log 2_node_size) between the maximum value and the minimum value of the initial node sizes in the x-axis, y-axis, and z-axis directions is the smallest, in other words, a case where the initial node sizes in the x-axis, y-axis, and z-axis directions are equal to one another means that the shape of the node is a cube.

On the other hand, as the difference (the value of gps_max_diff_log 2_node_size) between the maximum value and the minimum value of the initial node sizes in the x-axis, y-axis, and z-axis directions increases, the initial shape of the node becomes an elongated or flat cuboidal shape.

It may be defined that the value of gps_max_diff_log 2_node_size always has a value of "0" or higher. It may be also defined that the value of gps_max_diff_log 2_node_size is always a value equal to or lower than the value of gps_max_log 2_node_size.

Since the GPS 2011 is provided with gps_max_diff_log 2_node_size as the control data, the minimum value and the maximum value of the syntax about the initial size data in each of the x-axis, y-axis, and z-axis directions of a later-described node can be defined.

Also, since the GPS 2011 is provided with gps_max_diff_log 2_node_size, the cases where the initial node shape is extremely elongated or is extremely flattened can be eliminated, and designing of the point-cloud decoding device 200 is facilitated.

As the control data about "Implicit QtBt", the GPS 2011 may include a value (gps_max_num_implicit_qtbt_before_ot) corresponding to later-described K and a value (gps_min_size_implicit_qtbt) corresponding to later-described M.

The value of gps_max_num_implicit_qtbt_before_ot may be defined to be always a value of "0" or higher. Also, the value of gps_max_num_implicit_qtbt_before_ot may be defined to be always a value of gps_max_log 2_node_size or lower.

The value of gps_min_size_implicit_qtbt may be defined to be always a value of "0" or higher. Also, the value of gps_min_size_implicit_qtbt may be defined to be always a value of gps_max_log 2_node_size or lower.

FIG. 5 is an example of a syntax configuration of GSH.

The GSH 2012A/2012B may include syntax (gsh_geometry_parameter_set_id) for specifying the GPS 2011 corresponding to the GSH 2012A/2012B.

When the value of gps_implicit_geom_partition_flag is "1", the GSH 2012A/2012B may additionally include control data about "Implicit QtBt" in the GPS 2011 corresponding to the GHS 2012A/2012B.

As the control data about "Implicit QtBt", the GSH 2012A/2012B may include a flag (gsh_implicit_geom_partition_flag) which controls whether to apply "Implicit QtBt" or to apply "Octree" when the slice data 2013A/2013B corresponding to the GSH 2012A/2012B is to be decoded.

For example, it may be defined that, when the value of gsh_implicit_geom_partition_flag is "1", "Implicit QtBt" is applied, and it may be defined that, when the value of gsh_implicit_geom_partition_flag is "0", "Octree" is applied.

When the GSH 2012A/2012B does not include gsh_implicit_geom_partition_flag, the geometry information decoding unit 2010 may consider the value of gsh_implicit_geom_partition_flag as "0".

Since the GSH 2012A/2012B is provided with gsh_implicit_geom_partition_flag, whether "Implicit QtBt" is to be applied or not can be controlled by a slice unit.

When the value of gsh_implicit_geom_partition_flag is "1", the GSH 2012A/2012B may include syntax (gsh_log 2_max_nodesize_x) representing the initial node size in the x-axis direction.

The value of gsh_log 2_max_nodesize_x may be defined to be always a value of "0" or higher. Also, the value of gsh_log 2_max_nodesize_x may be defined to be always a value equal to or lower than gps_max_log 2_node_size.

Figure 6:
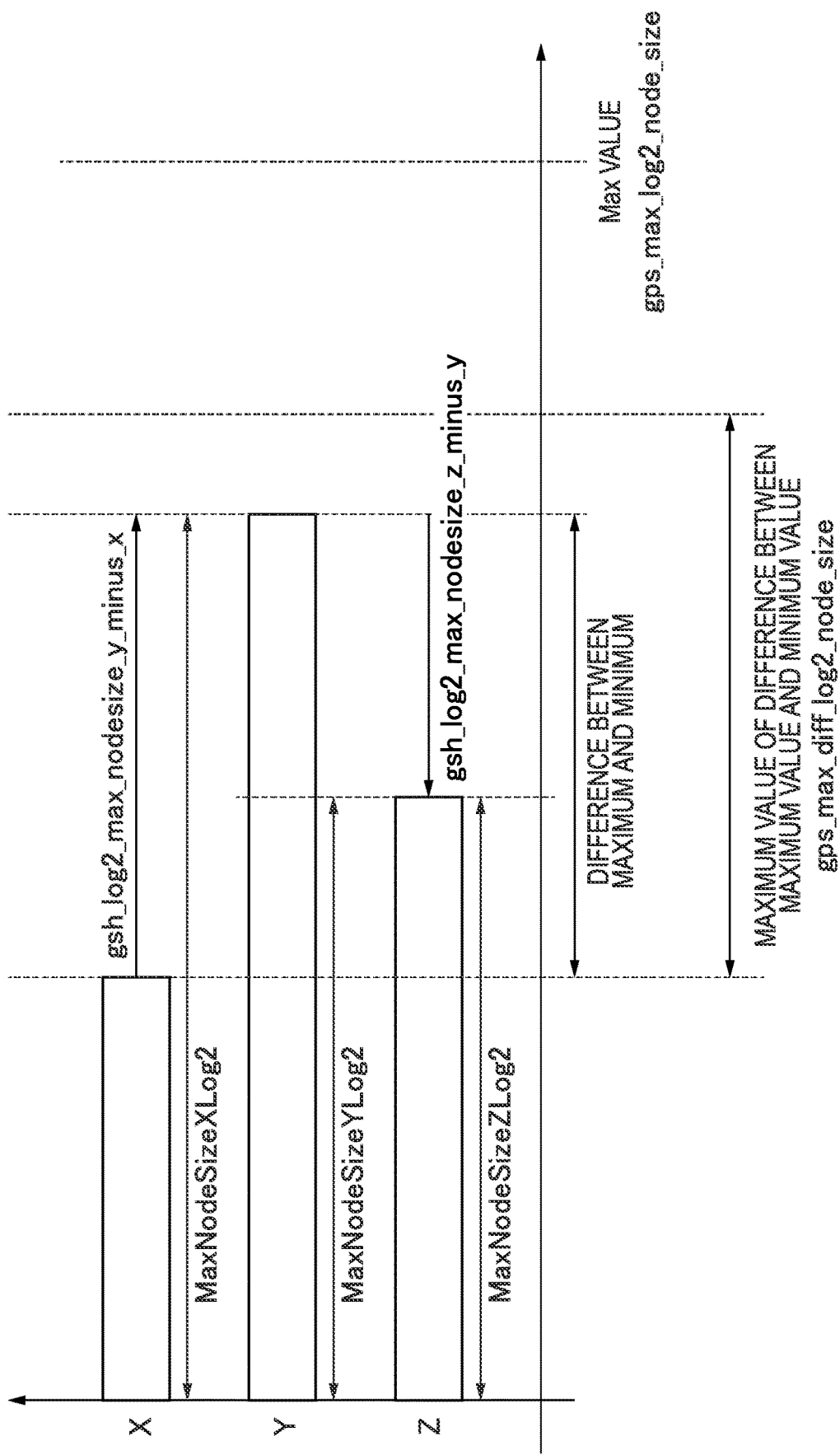
FIG. 6 is a diagram for describing syntax of the GSH 2012A/2012B according to the embodiment.

As illustrated in FIG. 6, the initial node size in the x-axis direction may be expressed by a variable MaxNodeSizeXLog 2, and MaxNodeSizeXLog 2=gsh_log 2_max_nodesize_x may be defined. When the value of gsh_implicit_geom_partition_flag is "1", the GPS 2011 may include, as syntax, a value (gsh_log 2_max_nodesize_y_minus_x) obtained by subtracting the initial node size in the x-axis direction (MaxNodeSizeXLog 2) from the initial node size in the y-axis direction. gsh_log 2_max_nodesize_y_minus_x may be encoded by signed 0-exponent Golomb (se (v)).

The value of gsh_log 2_max_nodesize_y_minus_x may be defined to be equal to or higher than-gps_max_diff_log 2_node_size and equal to or lower than gps_max_diff_log 2_node_size.

In other words, it may be defined that the absolute value of gsh_log 2_max_nodesize_y_minus_x is equal to or lower than gps_max_diff_log 2_node_size.

Also, it may be defined that the initial node size in the y-axis direction (=MaxNodeSizeXLog 2+gsh_log 2_max_nodesize_y_minus_x) has a value equal to or higher than "0" and equal to or lower than gps_max_log 2_node_size.

Also, by integrating the above described definitions, it may be defined that the value of gsh_log 2_max_nodesize_y_minus_x is a value equal to or higher than Max (−MaxNodeSizeXLog 2, −gps_max_diff_log 2_node_size) and equal to or lower than Min (gps_max_log 2_node_size-MaxNodeSizeXLog 2, gps_max_diff_log 2_node_size).

Note that Max (a, b) is a function which returns the maximum value between two arguments a and b, and Min (a, b) is a function which returns the minimum value between two arguments a and b.

As illustrated in FIG. 6, the initial node size in the y-axis direction may be expressed by a variable MaxNodeSizeYLog 2, and MaxNodeSizeYLog 2=MaxNodeSizeXLog 2+gsh_log 2_max_nodesize_y_minus_x may be defined.

When the value of gsh_implicit_geom_partition_flag is "1", the GPS 2011 may include, as syntax, a value (gsh_log 2_max_nodesize_z_minus_y) obtained by subtracting the initial node size in the y-axis direction (MaxNodeSizeYLog 2) from the initial node size in the z-axis direction.

The value of gsh_log 2_max_nodesize_z_minus_y may be defined to be equal to or higher than-gps_max_diff_log 2_node_size and equal to or lower than gps_max_diff_log 2_node_size.

Also, the difference between the initial node size in the z-axis direction and the initial node size in the x-axis direction (=gsh_log 2_max_nodesize_y_minus_x+gsh_log 2_max_nodesize_z_minus_y) may be defined to be equal to or higher than-gps_max_diff_log 2_node_size and equal to or lower than gps_max_diff_log 2_node_size.

In other words, it may be defined that the absolute value of gsh_log 2_max_nodesize_z_minus_y is equal to or lower than gps_max_diff_log 2_node_size and that the absolute value of gsh_log 2_max_nodesize_y_minus_x+gsh_log 2_max_nodesize_z_minus_y is equal to or lower than gps_max_diff_log 2_node_size.

Also, it may be defined that the initial node size in the z-axis direction (=MaxNodeSizeYLog 2+gsh_log 2_max_nodesize_z_minus_y) always has a value equal to or higher than "0" and equal to or lower than gps_max_log 2_node_size.

Also, by integrating the above described definitions, it may be defined that the value of gsh_log 2_max_nodesize_z_minus_y is a value equal to or higher than Max (−MaxNodeSizeYLog 2, Max (−gps_max_diff_log 2_node_size,-gps_max_diff_log 2_node_size-gsh_log 2_max_nodesize_y_minus_x)) and equal to or lower than Min (gps_max_diff_log 2_node_size-MaxNodeSizeYLog 2, Min (gps_max_diff_log 2_node_size-gsh_log 2_max_nodesize_y_minus_x, gps_max_diff_log 2_node_size)).

As illustrated in FIG. 6, the initial node size in the z-axis direction may be expressed by a variable MaxNodeSizeZLog 2, and MaxNodeSizeZLog 2=MaxNodeSizeYLog 2+gsh_log 2_max_nodesize_z_minus_y may be defined.

When the value of gsh_log 2_max_nodesize_z_minus_y is "0", the GPS 2011 may include syntax (gsh_log 2_max_nodesize) representing an initial node size.

It may be also defined that the value of gsh_log 2_max_nodesize is a value equal to or higher than "O" and equal to or lower than gps_max_log 2_node_size. When the value of gsh_implicit_geom_partition_flag is "0", only a cube is assumed as the shape of the node, and, therefore, the initial node sizes in all the directions of the x-axis, the y-axis, and the z-axis can be defined by gsh_log 2_max_size. The initial node size may be expressed by a variable MaxNodeSizeLog 2, and MaxNodeSizeLog 2=gsh_log 2_max_nodesize may be defined.

The example in which the GSH 2012A/2012B is provided with gsh_implicit_geom_partition_flag has been shown above. However, even when gsh_implicit_geom_partition_flag is not present, a process similar to the above can be carried out.

When gsh_implicit_geom_partition_flag is not present, the geometry information decoding unit 2010 can carry out a process of, when the value of gps_implicit_geom_partition_flag is "1", decoding gsh_log 2_max_nodesize_x, gsh_log 2_max_nodesize_y_minus_x and gsh_log 2_max_nodesize_z_minus_y and, when the value of gps_implicit_geom_partition_flag is "0", decoding gsh_log 2_max_nodesize.

(Tree Synthesizing Unit 2020)

An example of a process of the tree synthesizing unit 2020 will be described by using FIG. 7 to FIG. 9.

Figure 7:
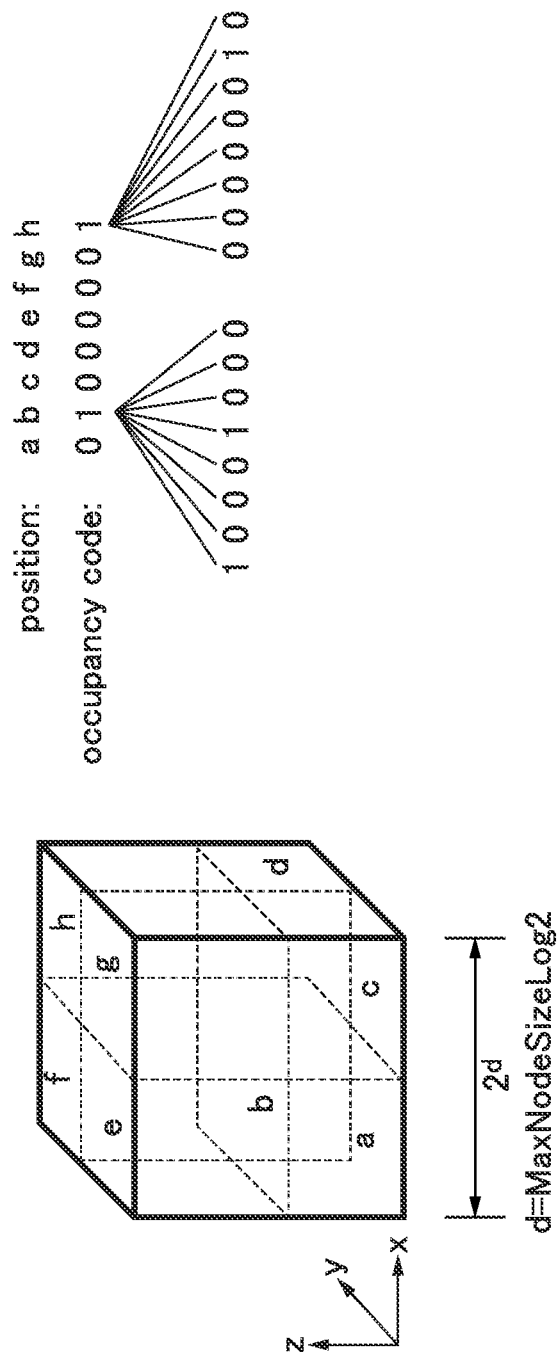
FIG. 7 is a diagram for describing an example of a process of a tree synthesizing unit 2020 of the point-cloud decoding device 200 according to the embodiment.

FIG. 7 is a diagram describing a process of a case where "Octree" is applied, in other words, a case where the value of gps_implicit_geom_partition_flag is "0" or a case where the value of gsh_implicit_geom_partition_flag is "0".

When "Octree" is applied, first, the tree synthesizing unit 2020 defines the initial node size as illustrated in FIG. 7 by using MaxNodeSizeLog 2 decoded by the geometry information decoding unit 2010. As described before, in the case of "Octree", the node shape is a cube.

Secondly, the tree synthesizing unit 2020 divides the initial node by half in each of the x-axis, y-axis, and z-axis directions to divide the node into eight child nodes. Hereinafter, the child nodes are denoted and described by labels a to h for the sake of convenience.

Thirdly, the tree synthesizing unit 2020 references occupancy code decoded by the geometry information decoding unit 2010.

The first 8 bits of occupancy code represent whether the points of the decoding target are included in the above described respective child nodes a to h. When the value of occupancy code is "1", it means that the point is present in the child node. When the value of occupancy code is "0", it means that the point is not present in the child node. The example of FIG. 7 means that the points are present only in the child node b and the child node h.

Fourth, the tree synthesizing unit 2020 divides each of the child node b and the child node h, in which the points are present, again by half in each of the x-axis, y-axis, and z-axis directions to divide each node to eight child nodes.

Fifth, the tree synthesizing unit 2020 again references next occupancy code and determines whether the point is present in each of the child nodes.

Hereinafter, the tree synthesizing unit 2020 recursively repeats these processes, thereby generating the tree information that in which regions in the space defined by the initial node the points are present.

Figure 8A:
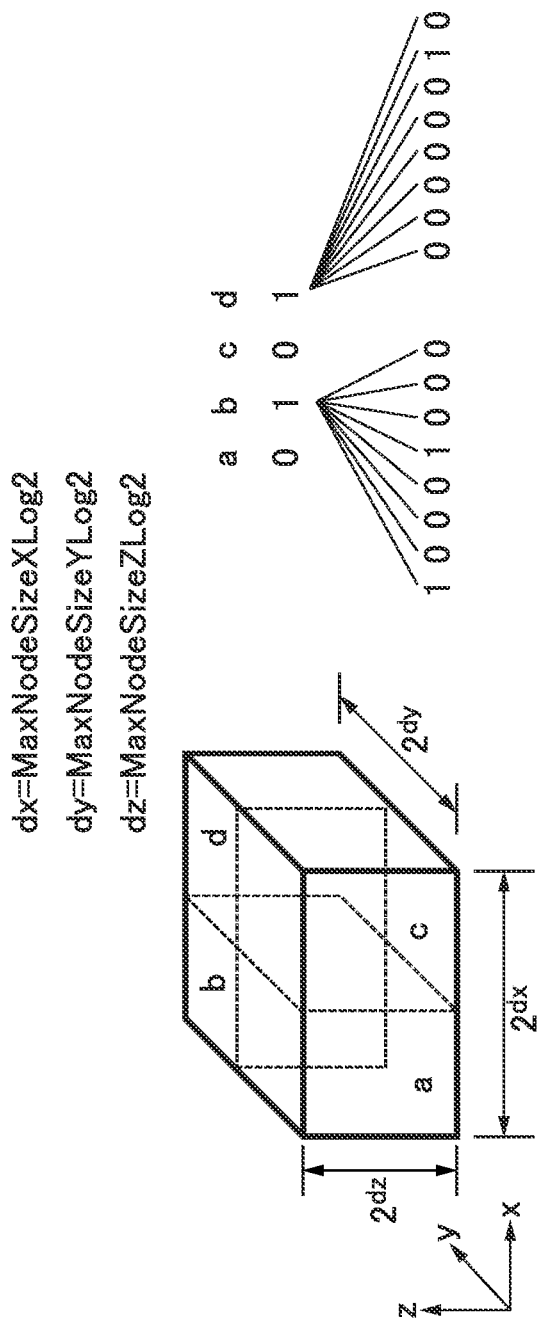

FIGS. 8A and 8B is a diagram describing a process of a case where "Implicit QtBt" is applied, in other words, a case where the value of gps_implicit_geom_partition_flag is "1" or a case where the value of gsh_implicit_geom_partition_flag is "1".

When "Implicit QtBt" is applied, the tree synthesizing unit 2020 defines the initial node size as illustrated in FIGS. 8A and 8B by using MaxNodeSizeXLog 2, MaxNodeSizeYLog 2, and MaxNodeSizeZLog 2 decoded by the geometry information decoding unit 2010. As described before, in the case where "Implicit QtBt" is applied, the node shape is a cuboid (as a matter of course, a cube is also a type of cuboids).

Also in the case where "Implicit QtBt" is applied, a basic process is the same as the case where "Octree" is applied. In the case where "Octree" is applied, the node was always divided into eight child nodes. On the other hand, in the case where "Implicit QtBt" is applied, the node is divided into four child nodes or two child nodes in some cases.

FIG. 8A illustrates an example of a case where the node is divided into four child nodes, and FIG. 8B illustrates an example of a case where the node is divided into two child nodes.

As illustrated in FIG. 8A, in the case where the node is divided into four child nodes, corresponding occupancy code becomes 4 bits. Similarly, as illustrated in FIG. 8B, in the case where the node is divided into two child nodes, corresponding occupancy code becomes 2 bits.

By which number among eight, four, and two the node is to be divided (which one of octree division, quadtree division, and binary tree division is to be carried out) is implicitly determined by using the number of times of division since the initial node, the sizes of the node in the x-axis direction, the y-axis direction, and the z-axis direction, and the values of the control data (K and M) decoded by the geometry information decoding unit 2010. As a specific determination method, the method described in Non Patent Literature 1 or 2 can be used.

Herein, K is a parameter which defines the maximum value of the number of times of carrying out the quadtree division or binary tree division before the octree division is initially carried out. Also, M is a parameter which defines the minimum node size to carry out the quadtree division and binary tree division.

As described above, the position of each point (each corresponding to a node having a size of 1×1×1) constituting a point cloud can be decoded by recursively repeating the division until all the node sizes become the size of 1×1×1.

Note that, in the case where later-described scalable lifting is applied (in the case where lifting_scalability_enabled_flag=1), the above described decoding process may be controlled by the value of a parameter skipOctreeLayers determined by a user before operating the decoding device.

Figure 9:
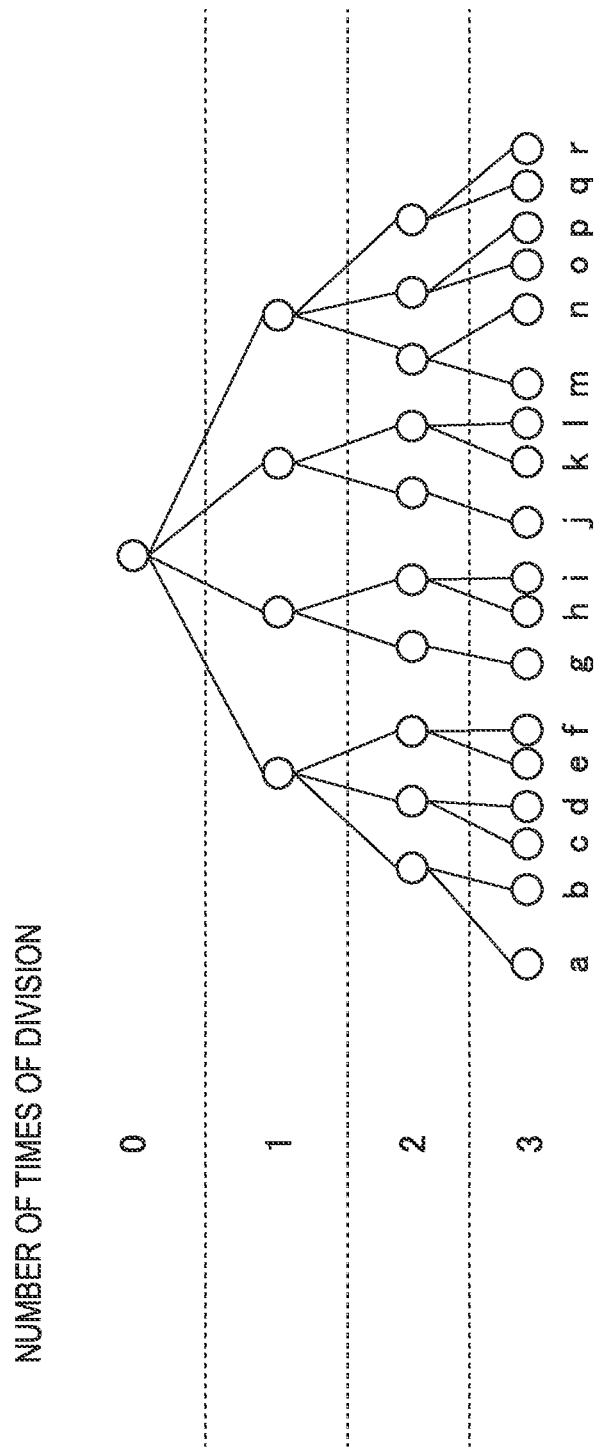
FIG. 9 is a diagram for describing an example of a tree structure divided by the process of the tree synthesizing unit 2020 of the point-cloud decoding device 200 according to the embodiment.

For example, FIG. 9 illustrates an example of a tree structure of a case where all the node sizes become the size of 1×1×1 as a result of repeating the division three times since the initial node. Herein, when the value of skipOctreeLayers is "0", the division is carried out three times for each node as well as the above description. Next, for example, in the case of skipOctreeLayers=2, the division process of lower two times are omitted. Since the case of FIG. 9 corresponds to omitting the division process of the layer for which the number of times of division is described as two and three, the decoding process is terminated at the time point when the division is carried out one time for each node.

The position information of each point decoded in the above described manner is output to the RAHT unit 2080 and the LoD calculation unit 2090 via the approximate-surface synthesizing unit 2030 and the geometry information reconfiguration unit 2040. In this process, the position information of each point is transmitted as data saved in a one-dimensional array, and, as an order of the data, a restriction that the data of the points belonging to the same parent node is adjacent to each other may be defined.

In other words, the geometry information reconfiguration unit 2040 may cause the position information of each point to be one-dimensional arrayed data and, as the order of the arrayed data, may output the data in a state in which the data of the points belonging to the same parent node is arranged to be adjacent to each other.

For example, the example of FIG. 9 means that the data of the points is stored in the alphabetical order, i.e., the order of abcd . . . pqr. In this arrangement order, for example, when the nodes of a tier at which the number of times of division is two is considered as parent nodes, for example, each pair of nodes a and b, nodes c and d, nodes e and f, and so on represents the points which belong to the same parent node. Also, when the nodes of a tier at which the number of times of division is one is considered as parent nodes, each group of nodes a to f, nodes g to i, nodes j to l, and nodes m to r belongs to the same parent node.

Also, similarly, the above described order of arrayed data can be also described as a restriction that the points are arranged in the order of a case where the points are processed by breadth-first search. (Attribute-Information Decoding Unit 2060)

Hereinafter, the control data decoded by the attribute-information decoding unit 2060 will be described by using FIG. 10 and FIG. 11.

Figure 10:
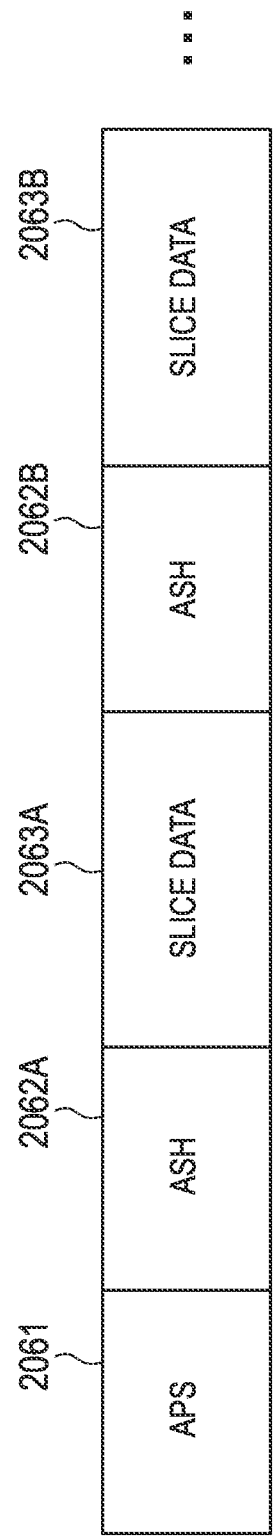
FIG. 10 is a configuration example of encoded data (bit stream) received by an attribute-information decoding unit 2060 of the point-cloud decoding device 200 according to the embodiment.

FIG. 10 is a configuration example of the encoded data (bit stream) received by the attributegeometry information decoding unit 2060.

First, the bit stream may include APS 2061. The APS 2061 is also called an attribute parameter set and is an aggregate of control data about decoding of attribute information. A specific example will be described later. Each APS 2061 includes at least APS id information for individual identification in a case where plural pieces of APS 2061 are present.

Secondly, the bit stream may include ASH 2062A/2062B. The ASH 2062A/2062B are also called attribute slice headers and are aggregates of the control data corresponding to later-described slices. A specific example will be described later. The ASH 2062A/2062B includes at least APS id information for specifying the APS 2061 corresponding to the ASH 2062A/2062B, respectively.

Thirdly, the bit stream may include slice data 2063A/2063B subsequent to the ASH 2062A/2062B. The slice data 2063A/2063B includes encoded data of attribute information.

As described above, the bit stream is configured so that the respective ASH 2062A/2062B and the APS 2061 correspond to each slice data 2063A/2063B.

As described above, since which APS 2061 is to be referenced is specified by the APS id information in the ASH 2062A/2062B, the common APS 2061 can be used for the plural pieces of slice data 2063A/2063B.

In other words, the APS 2061 is not always required to be transmitted for each slice. For example, the bit stream can be configured so that the APS 2061 is not encoded immediately anterior to the ASH 2062B and the slice data 2063B like FIG. 10.

Note that the configuration of FIG. 10 is merely an example. As long as the ASH 2062A/2062B and the APS 2061 are configured to correspond to each slice data 2063A/2063B, an element(s) other than those described above may be added as a constituent element(s) of the bit stream. For example, the bit stream may include a sequence parameter set (SPS).

Similarly, for transmission, the bit stream may be formed into a configuration different from that of FIG. 10. Furthermore, the bit stream may be synthesized with the bit stream, which is decoded by the above described geometry information decoding unit 2010, and transmitted as a single bit stream. For example, each of the slice data 2013A and 2063A and the slice data 2013B and 2063B is treated as single slice data, and the GSH 2012A and the ASH 2062A or GSH 2012B and ASH 2062B may be configured to be disposed immediately anterior to each slice. Also, in such a case, the GPS 2011 and the APS 2061 may be disposed before each GSH and ASH.

FIG. 11 is an example of a syntax configuration of the APS 2061.

The APS 2061 may include APS id information (aps_attr_parameter_set_id) for identifying each APS 2061.

The APS 2061 may include the information (attr_coding_type) which represents a decoding method of the attribute information. For example, it may be defined that: when the value of attr_coding_type is "0", variable weighted lifting prediction is carried out by the inverse lifting unit 2100; when the value of attr_coding_type is "1", RAHT is carried out by the RAHT unit 2080; and, when the value of attr_coding_type is "2", lifting prediction with a fixed weight is carried out by the inverse lifting unit 2100.

The APS 2061 may include a flag (lifting_scalability_enabled_flag) which represents whether the scalable lifting is to be applied or not when the value of attr_coding_type is "2", in other words, when the lifting prediction with the fixed weight is to be carried out by the inverse lifting unit 2100.

It may be defined that, when the value of lifting_scalability_enabled_flag is "0", the scalable lifting is not to be applied; and, when the value of lifting_scalability_enabled_flag is "1", the scalable lifting is to be applied.

Also, it may be defined that, when the value of lifting_scalability_enabled_flag is "1", in other words, when the scalable lifting is to be applied, skipOctreeLayers is acquired as described above as an external parameter for execution of the point-cloud decoding device 200.

Also, it may be defined that, when the above described "Implicit QtBt" is to be applied, in other words, when the value of gps_implicit_geom_partition_flag is "1", the scalable lifting is not to be applied, in other words, the value of lifting_scalability_enabled_flag is always "0".

More specifically, the geometry information decoding unit 2010 which decodes the flag which controls whether to apply "Implicit QtBt" or not and the attribute-information decoding unit 2060 which decodes a flag which controls whether to apply "scalable lifting" or not are provided. A restriction may be set not to apply "scalable lifting" when "Implicit QtBt" is applied.

By setting the restriction so that "Implicit QtBt" or the scalable lifting is exclusively applied in this manner, specifications can be simplified by reducing the combination of functions, and implementation can be simplified.

For example, by setting the restriction to always apply "Octree" when the scalable lifting is applied, the node shape is always a cube in the process of the scalable lifting, and the process can be executed on an assumption that octree division is always carried out in each division. Therefore, the specifications can be simplified compared with the case where the node shape is a cuboid and quadtree and binary tree division is also allowed in addition to octree division as the type of division.

(LOD Calculation Unit 2090)

Hereinafter, an example of processing contents of the LoD calculation unit 2090 will be described by using FIG. 12 to FIG. 15.

Figure 12:
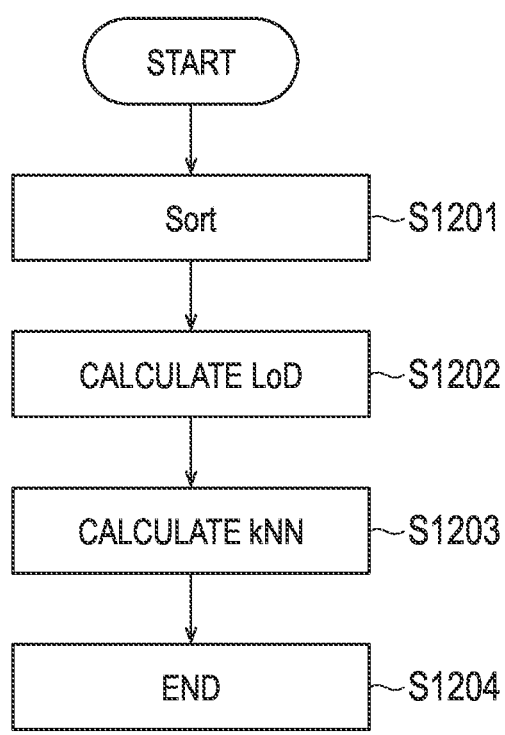
FIG. 12 is a flow chart describing an example of a processing procedure of a LoD calculation unit 2090 of the point-cloud decoding device 200 according to the embodiment.

FIG. 12 is an example of a flow chart of the LOD calculation unit 2090.

In step S1201, the LoD calculation unit 2090 carries out a process of rearranging (sorting) the position information data of the points in the point cloud output from the geometry information reconfiguration unit 2040.

Herein, as described above, the position information data of the points is arranged in the one-dimensional array in the output of the tree synthesizing unit 2020, and, when the order thereof is restricted so that the position information data of the points belonging to the same parent node is arranged to be always adjacent to each other or when the points are restricted to be arranged in the order of processing by breadth-first search, the present process may omit the process of the present step and directly proceed to step S1202.

If the restriction as described above is not set, sorting is carried out by a below procedure. An example of a sorting method will be described by using FIGS. 13 and 14.

Figure 13B:
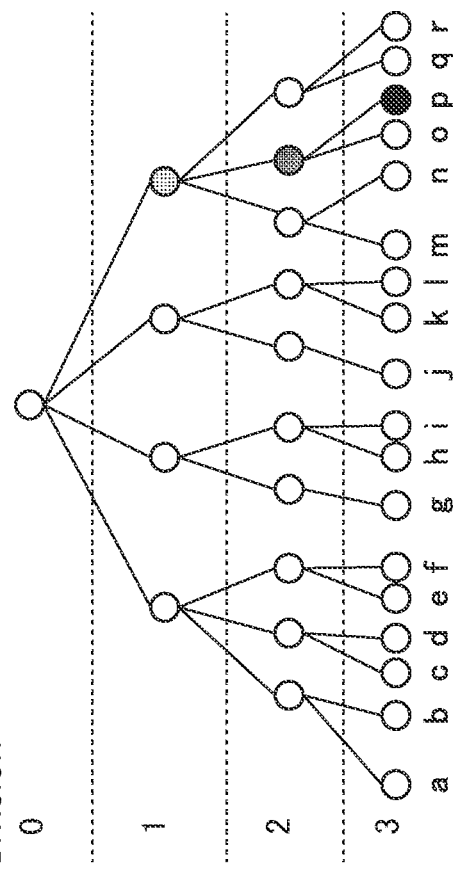
Figure 13A:
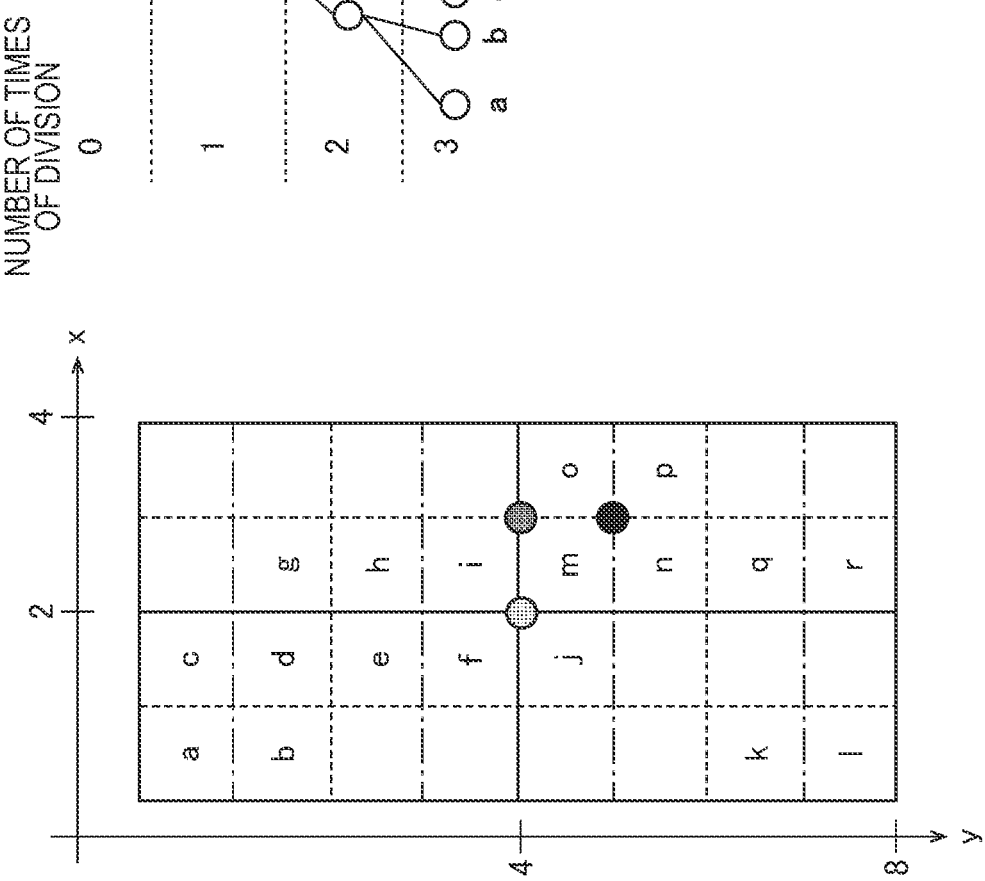

FIG. 13A illustrates an example of a division result of a case where (x, y)=(4, 8) is used as the initial node size, FIG. 13B illustrates an example of a division tree corresponding to FIG. 13A, and FIG. 13C illustrates examples of Morton Code and Partition-based Code calculated from the coordinates of FIG. 13A. Hereinafter, two dimensions of the x-axis and the y-axis will be described for simplicity. However, the below description can be easily extended to three dimensions (x, y, z) by similarly adding the information about the z-axis to the x-axis and the y-axis.

FIG. 13A illustrates an example of a case where the initial node size is (x, y)=(4, 8), quadtree division into four child nodes of (2, 4) is carried out in first division, each the nodes of the size (2, 4) is subjected to quadtree division into four child nodes of a size (1, 2) in second division, and each of the nodes of the size (1, 2) is subjected to binary tree division into two child node of a size (1, 1) in third division.

FIG. 13B corresponds to the number of nodes in which at least one point of position information data is present in each of the above described number of times of division. In other words, FIG. 13B illustrates the number of nodes, wherein the value of Occupancy code is 1.

Also, alphabetical characters a to r in a lower part of FIG. 13B correspond to the nodes a to r of the size 1×1 in FIG. 13A.

In FIG. 13A, it is assumed that position information data is present in the nodes labeled with a to r, and position information data is not present, in other words, point data is not present in the other nodes.

Note that, hereinafter, the coordinates of each node represent the point at which each of the x-coordinate and the y-coordinate in the region occupied by the node is minimum. In the example of FIG. 13A, since an origin is at the upper left of FIG. 13A, the coordinates of each node are the coordinates of the position at the upper left corner of each node. For example, the coordinates of the node p is (x, y)=(3, 5). Before carrying out the sorting process, the LoD calculation unit 2090 calculates Morton Code or Partition-based Code.

First, a case where sorting is carried out by using Morton Code will be described.

In a case of three-dimensional space, Morton Code is calculated by following (Equation 1) based on the coordinates of each node.

[Mathematical Equation 1]

$$\text{MortonCode} = \sum_i 2^{3i+2}[z \,\&\, 2^i] + 2^{3i+1}[y \,\&\, 2^i] + 2^{3i}[x \,\&\, 2^i] \quad \text{(Equation 1)}$$

Herein, i represents the digit number of a case where each of the x, y, and z coordinates is expressed by a binary number, and the digit number required depending on the initial node size is ensured. For example, since the largest node size is 8 in the example of FIGS. 13A to 13C, the coordinates of all integer positions can be expressed when 3 bits are prepared for each of the x-axis and the y-axis.

As illustrated in FIGS. 13A to 13C, a case of two-dimensional space is as follows.

[Mathematical Equation 2]

$$\text{MortonCode} = \sum_i 2^{2i+1}[y \,\&\, 2^i] + 2^{2i}[x \,\&\, 2^i] \quad \text{(Equation 2)}$$

An example of Morton Code calculated by using (Equation 2) is illustrated in FIG. 13C. When inverse transformation from Morton Code to coordinates is to be carried out, the calculation can be carried out by following (Equations 3).

[Mathematical Equations 3]

$$z = 2\Sigma_i 2^i[\text{MortonCode} \,\&\, 2^{3i+2}]$$

$$y = \Sigma_i 2^i[\text{MortonCode} \,\&\, 2^{3i+1}]$$

$$x = \Sigma_i 2^i[\text{MortonCode} \,\&\, 2^{3i}] \quad \text{(Equations 3)}$$

Similarly, as illustrated in FIGS. 13A to 13C, a case of two-dimensional space is as described in following (Equations 4).

[Mathematical Equations 4]

$$y = \Sigma_i 2^i[\text{MortonCode} \,\&\, 2^{i+1}]$$

$$x = \Sigma_i 2^i[\text{MortonCode} \,\&\, 2^{2i}] \quad \text{(Equations 4)}$$

Herein, an operator & is a logical conjunction in a bit unit.

FIG. 13C illustrates an example of a case where coordinates are calculated from Morton Code in a case of (x, y)=(3, 5).

As described above, the LOD calculation unit 2090 calculates Morton Code for each node and then carries out the sorting process.

An example of the sorting process of the case where Morton Code is used will be described by using FIG. 14.

In the leftmost column "initial" in FIG. 14, the nodes are randomly arranged. The 6-digit number in the right side of the alphabetical character attached to each node as a label is Morton Code of each node. Morton Code like these is calculated based on the coordinates of FIG. 13A.

Hereinafter, the LoD calculation unit 2090 sorts the data in this "initial" column so that the position information data of the points belonging to the same parent node is always adjacent to each other. In other words, the LoD calculation unit 2090 carries out sorting so that the data is in the alphabetical order as illustrated in the column of "node size=(2, 4)".

Note that, in the case of FIG. 13A, "Implicit QtBt" is applied, and both of the quadtree division and binary tree division are applied. In such a case, as illustrated in the column of "Morton Code order" of FIG. 14, when Morton Codes are sorted in ascending order, cases where the position information data of the points belonging to the same parent node is not adjacent to each other sometimes occur. For example, the node a belongs to the same parent node as the node b; however, when the nodes are arranged in the Morton Code order, the node a and the node c are arranged to be adjacent to each other.

Hereinafter, a method of carrying out sorting by applying the idea of radix sort so that the position information data of the points belonging to the same parent node is always adjacent to each other will be described.

First, a case where the nodes are divided into the smallest ones is taken into consideration. In the example of FIGS. 13A to 13C, the situation in which the number of times of division is three is considered. In this case, the node size is (x, y)=(1, 1). Therefore, attention is focused on the digits corresponding to x=1 and y=1 of each Morton Code. The lowest bit of Morton Code corresponds to x=1, and the second lowest bit corresponds to y=1. More specifically, a part surrounded by a rectangle in the column of "node size=(1, 1)" in FIG. 14 corresponds to x=1, y=1.

A result of sorting the data of the column "initial" by focusing only on the above described part surrounded by the rectangle is the column of "node size=(1, 1)". As is understood from FIG. 14, sorting has been carried out so that "00", "01", "10", and "11" are obtained in the order of "yx". Note that, regarding the order among the nodes having the focused same 2-bit pattern, the order in the column of "initial" is saved.

Secondly, a situation in which the number of times of division is two is considered. In this case, the node size is (x, y)=(1, 2). Therefore, attention is focused on the digits corresponding to x=1 and y=2 of each Morton Code. The lowest bit of Morton Code corresponds to x=1, and the fourth lowest bit corresponds to y=1. A result of sorting the data of the column "node size=(1, 1)" by focusing on the above described two bits is the column of "node size=(1, 2)".

Thirdly, similarly, a result of sorting the data of the column of "node size=(1, 2)" by focusing on the digits corresponding to x=2 and y=4 of each Morton Code in consideration of the situation in which the number of times of division is one is the column of "node size=(2, 4)".

As described above, by sequentially carrying out sorting from the lowest division layer toward the higher division layer while focusing only on the node size of each number of times of division and on the digits corresponding to the node size of Morton Code, sorting can be carried out so that the position information data of the points belonging to the same parent node is always adjacent to each other. The case of the two-dimensional flat surface of the x-axis and the y-axis has been described above as an example. Also in the case of three dimensions, sorting can be similarly carried out by additionally taking the data of the z-axis into consideration in each process.

Note that, also in the case where the scalable lifting is applied, similar sorting can be realized by taking the node sizes into consideration sequentially in the opposite order of the division process while using, as a starting point, the state in which the nodes are divided into smallest ones.

For example, if the value of the variable skipOctreeLayers is "1", the node size is (x, y)=(1, 2) in the example of FIG. 13A; therefore, the process is started from sorting that focuses on the 2 bits surrounded by the rectangle in the column of "node size=(1, 2)" illustrated in FIG. 14, and the sorting process is sequentially repeated until the highest division tier, in other words, until the sorting described in the column of "node size=(2, 4)" in the example FIG. 14 is completed.

The sorting method of the case using Morton Code has been described above.

Thus, the LoD calculation unit 2090 calculates Morton Codes from the coordinates of the points and sorts the position information data of the points by referencing the bits of Morton Codes corresponding to the node size in the above described division process.

As described above, Morton Code can be calculated only from the coordinates of each node. In other words, the calculation can be carried out without depending on how division has been carried out from the initial node (which one of octree, quadtree, and binary tree division has been carried out in what order).

Also, in the case of "Octree", in other words, when the node size is always a cube in three-dimensional space and division is always carried out by octree division, the position information data of the points belonging to the same parent node can be always arranged to be adjacent to each other by sorting the position data in the Morton Code order (for example, ascending order).

In the case of two-dimensional space, when the node size is always square and division is carried out always by quadtree division, similarly to the above description, the position information data of the points belonging to the same parent node can be always arranged so as to be adjacent to each other by sorting the position data in the Morton Code order (for example, ascending order).

Next, a sorting method of a case where Partition-based Code illustrated in FIG. 13C is used will be described. Partition-based Code uses, as one group, 2 bits in the order of "yx" in the case of a two-dimensional flat surface and 3 bits in the order of "zyx" in three-dimensional space and, in every division, shows, by bits, which space the coordinates of the point belong to after the division ("0" if the point belongs to the space of smaller coordinate, "1" if the point belongs to the space of the larger one).

For example, in the example of FIGS. 13A to 13C, after the first division (quadtree division), all of the node m, the node o, and the node p belong to the child nodes having a size (x, y)=(2, 4) in FIG. 13C. Therefore, the first 2 bits (corresponding to the first division) of Partition-based Code are "11" since both of x and y belong to the space of the larger coordinates.

The next 2 bits of Partition-based Code (2 bits at the center among 6 bits) correspond to the second division (quadtree division). After the second division, when considered among the nodes having the size (x, y)=(2, 4) in FIG. 13C, the node m becomes "00" since both x and y thereof belong to the space having smaller coordinates. The node o and the node p become "01" since x has a larger coordinate, and y has a smaller coordinate.

The next 2 bits of Partition-based Code (the lower 2 bits among the 6 bits) correspond to the third division (binary tree division). The third division is the division which is only in the y-direction. Each of the node m and the node o has "0" as the second lower bit since the node belongs to the smaller y-coordinate after the division. The lowest bit corresponds to the x-axis. However, since division in the x-axis direction is not carried out in the third division, the lowest bit is always "0". Alternatively, the bit may be omitted, and the digit may be reduced.

As described above, the lower 2 bits of Partition-based Code of the node m and the node o become "00 (or only "0")". Similarly, the lower 2 bits of the node p become "10 (or only "1")".

In other words, for example if the x-axis component of the coordinates for which Partition-based Code is desired to be calculated is X, the above described procedure is equivalent to outputting "1" if the value of X in certain division is equal to or higher than "the x-coordinate of the parent node+the x-axis direction size of the child node", outputting "0" if not, and similarly executing this also for the y-axis and the z-axis (in the case of three dimensions). Herein, the size of the child node is equivalent to ½ of the parent node size if division is carried out in the axis direction in this division, and the child node size is equivalent to the parent node size if this division is not carried out.

In other words, for every single division process, "1" is output for the x-, y-, or z-axis if the coordinate of a certain point is equal to or higher than the value obtained by adding the size of the child node in the division to the coordinate of the parent node in the division, and "0" is output for the x-, y-, or z-axis if not.

FIG. 13C illustrates an example of a case where inverse transformation is carried out from Partition-based Code calculated in the above described manner to coordinates. For example, the coordinates of the node p can be subjected to inverse transformation from Partition-based Code in the following manner.

First, the higher 2 bits correspond to the first division and are therefore assumed to be x=1×2 and y=1×4, respectively, by using the node size (x, y)=(2, 4) after the first division.

Secondly, the intermediate 2 bits correspond to the second division and are therefore assumed to be x=1×2+1×1 and y=1×4+0×1, respectively, in consideration of the preceding result, wherein the node size is (x, y)=(1, 2). Similarly, also regarding the lower 2 bits, inverse transformation can be carried out as (x, y)=(3, 5) in the end as illustrated in FIG. 13C in consideration of the node size in the third division.

As described above, the coordinates can be obtained by inverse transformation from the code calculated in the above described manner by calculating, for every single division process, the value which is the bit ("0" or "1") corresponding to the division multiplied by the node size after the division (the child node size in the viewpoint before the division) for all the division processes and then obtaining a sum for each of the x-, y-, and z-axes (in the case of three dimensions).

In other words, the LoD calculation unit 2090 calculates, for each point and for every single division process, the code which always generates bits (3 bits in total) corresponding to the x-, y-, and z-axes (in the case of three-dimensional space) and sorts the position information data of the points in the above described code order.

As described above, when the position information data of the points are sorted in the Partition-based Code order by calculating Partition-based Codes which generate the bits corresponding to the coordinate axes for each division, the position information data of the points belonging to the same parent node can be always arranged so as to be adjacent to each other. In other words, in the example of FIGS. 13A to 13C, sorting can be carried out in the alphabetical order of a to r.

In a case where "Octree" is applied, above described Partition-based Codes completely match Morton Codes.

Furthermore, Partition-based Code is merely a name given for explanatory convenience, and it is only required to be a code calculated by a similar method even if it has a different name. For example, it is only required to be a code which always generates bits (3 bits in total) corresponding to the x-, y-, and z-axes, respectively, for every single division. Also, for example, it is only required to be a code which is defined so that, for every single division process, "1" is output for the x-, y-, or z-axis if the coordinate of a certain point is equal to or higher than the value obtained by adding the size of the child node in the division to the coordinate of the parent node in the division, and "0" is output for the x-, y-, or z-axis if not. Also, for example, it is only required to be a code which is defined to enable inverse transformation from the code to the coordinates by carrying out computation in consideration of the node size corresponding to the division of the bits.

As described above, after the LOD calculation unit 2090 calculates Morton Codes or Partition-based Codes and carries out the sorting process corresponding thereto, the present process proceeds to step S1202.

In step S1202, the LoD calculation unit 2090 calculates LoD for the position information of each point.

Hereinafter, a LoD calculation process of a case where the scalable lifting is applied will be described. A LoD calculation method of a case where the scalable lifting is not applied can be realized, for example, by the method described in Editorial input on G-PCC draft text, ISO/IEC, JTC1/SC29/WG11, m51806 and G-PCC codec description V5, ISO/IEC, JTC1/SC29/WG11, N18891.

In the LoD calculation process of the case where the scalable lifting is applied, in the order from the lowest LoD (corresponding to the number of times of division 3 in the example of FIGS. 13A to 13C), a process of sending only one point among the points, which belong to the same parent node, to a higher LoD and giving a LoD to the other points as the points which belong to this LoD is carried out.

For example, allocation is carried out while increasing LoD by one every time sequentially until the number of times of division becomes 0, wherein the lowest LoD is "0", and the LOD higher by one level is "1" (corresponding to the layer of the number of times of division of 2 in the example of FIGS. 13A to 13C).

For example, it may be determined so that, if the value of a LoD is an even number, the node having the smallest value of Morton Code or Partition-based Code among the nodes belonging to the same parent node is sent to a higher LoD and that, if the value of a LoD is an odd number, the node having the largest value of Morton Code or Partition-based Code among the nodes belonging to the same parent node is sent to a higher LoD. Alternatively, the above described process of the case where the value of the LoD is an odd number and the process of the case where the value of the LoD is an even number may be mutually switched.

Regarding the case where Morton Code is used and the case where Partition-based Code is used, specific processes will be described below.

First, an example of a case where a LoD is calculated for the position information data of the points which have been sorted in step S1201 by above described Morton Code calculation and the method described by using FIG. 14 will be described.

First, the LoD calculation unit 2090 starts the process from the lowest LOD (LOD "0"). For example, in the example of FIGS. 13A to 13C, the size of the parent node of the node ((x, y)=(1, 1) size) corresponding to the lowest LoD is (x, y)=(1, 2). By using this, among Morton Codes, attention is focused only on those at the places equal to or higher than ones place of the bits corresponding to x and those at the places equal to or higher than second place of the bits corresponding to y.

Specifically, attention is focused only on the parts surrounded by rectangles illustrated in a column "parent node size=(1, 2)" in FIG. 15.

Secondly, the LoD calculation unit 2090 groups the nodes which have the same patterns in the parts surrounded by the rectangles. For example, the nodes a and b, the nodes c and d, and the nodes e and f have the same patterns. Note that this grouping can be realized also by a loop process.

For example, first, the LOD calculation unit 2090 extracts the pattern of the part surrounded by the above described rectangle from Morton Code of the first node a and saves the pattern. Also, the LoD calculation unit 2090 sets this node as a start point.

Secondly, the LoD calculation unit 2090 processes the node b and the node c sequentially, similarly extracts the patterns of the parts surrounded by the rectangles, and compares the patterns with the pattern of the node a saved before. In this process, if the pattern is different from the saved pattern, the LOD calculation unit 2090 sets the node, which has been checked immediately before, (the node having the largest Morton Code among the nodes having the same pattern as the start point) as an end point.

Thirdly, the LOD calculation unit 2090 sends one node among the nodes, which are included between the start point and the end point, to the higher LOD and applies the LOD to the other nodes.

Fourth, the LoD calculation unit 2090 sets the node, which has the pattern different from the above described saved pattern, as a new start point and repeats the same process as the above description for all the nodes.

This grouping corresponds to the group of the child nodes having the same parent node. Therefore, the LoD calculation unit 2090 checks the values of all the bits of Morton Codes in each of the groups and sends the node, which has the smallest or the largest value, to the higher LoD. The example of FIG. 15 illustrates a case where the node, which has the smaller Morton Code, is sent to the higher LoD.

The process of LoD "1" corresponds to "parent node size=(2, 4)" in FIG. 15. The nodes described in the column of "parent node size=(2, 4)" are the points sent from the above described lowest LoD to this LoD. This LoD corresponds to the number of times of division of 2 in FIGS. 13A to 13C. The size of the parent node of the nodes corresponding to this LOD is (x, y)=(2, 4).

Therefore, like the above described case, attention is focused only on the place equal to or higher than the second place regarding the bits corresponding to x of Morton Codes and on the place equal to or higher than the fourth place regarding the bits corresponding to y.

Fifth, like the above described case, the LOD calculation unit 2090 carries out grouping and sends one node from the same group to a higher LoD. The example of FIG. 15 is an example of the case where the node having the largest Morton Code in the same group is sent to the higher LoD.

The LoDs of all the points can be determined by repeating the above described process up to the LOD corresponding to the number of times of division of 0 in FIGS. 13A to 13C.

In other words, the LOD calculation unit 2090 references the bits of Morton Code corresponding to the digit, which is equal to or higher than the node size thereof, and calculates the LOD of each point.

The example of the case where the value of the variable skipOctreeLayers is "0" has been described above. For example, if the value of the variable skipOctreeLayers is "1", the process of one lower tier is skipped, and the process is started from that of the column of "parent node size=(2, 4)" in FIG. 15. Similarly, if the value of the variable skipOctreeLayers is "N", the process of N lower tier(s) is skipped.

Next, a case where Partition-based Code is used will be described. Also in the case where Partition-based Code is used, a LoD is determined by grouping the nodes basically like the above described manner, sending one node of each group to a higher LOD, and causing the other nodes to belong to this LoD.

In the case of Partition-based Code, as described by using FIGS. 13A to 13C, in two dimensions, each 2-bit pair of "yx" corresponds to each division. Therefore, in the LoD process of the lowest layer, the child nodes belonging to the same parent node can be grouped by ignoring the lower 2 bits and carrying out grouping by the pattern of the higher 4 bits. Similarly, in the second LoD from the lowest layer, grouping can be carried out with the pattern of the higher 2 bits of Partition-based Code. The processes thereafter are similar to those of the above described case of Morton Code.

After the LoD of each node is calculated in the above described manner, the present process proceeds to step S1203.

In step S1203, regarding each node, the LOD calculation unit 2090 carries out k-nearest neighbor search with respect to the nodes belonging to the higher LoD than the LoD of this node. In the k-nearest neighbor search, the distances between the nodes have to be calculated. In this process, if the scalable lifting is applied and if the value of skipOctreeLayers is "1" or higher, the node size is larger than (x, y, z)=(1, 1, 1), and the precise position of the point cannot be found out.

Therefore, the LoD calculation unit 2090 calculates a distance by using coordinate values, which have been quantized by using the node size of each LOD, as the coordinate values of this node. Specifically, the LoD calculation unit 2090 may carry out the quantization so that the coordinates are at the center of each node.

ShiftX=Log 2(x-direction size of the node)

x=("x-coordinate of the node">>ShiftX)<<ShiftX+"x-direction size of the node"/2

ShiftY=Log 2(y-direction size of the node)

y=("y-coordinate of the node">>ShiftY)<<ShiftY+"y-direction size of the node"/2

ShiftZ=Log 2(z-direction size of the node)

z=("z-coordinate of the node">>ShiftZ)<<ShiftZ+"z-direction size of the node"/2

For example, in the example of FIGS. 13A to 13C, if the value of skipOctreeLayers is "1", the x-direction size of the node is "1", and the y-direction size of the node is "2". Therefore, a binary logarithm is taken for each of them, and above described ShiftX is "0", and ShiftY is "1".

If the coordinates of the two nodes become completely the same as a result of carrying out the above described quantization, for example, the distance between them (L2 norm) may be defined as the square of the length of the short side of the node size.

More specifically, for each LOD, the LOD calculation unit 2090 carries out the k-nearest neighbor search between the node belonging to the LoD and the node belonging to the higher one of the LoD. In the above described k-nearest neighbor search, if "scalable lifting" is applied to the slice, the center coordinates of the node of the LoD are calculated by referencing the node size in each of the x-, y-, and z-axes, and the center coordinates are considered as the coordinates of the node.

The LoD calculation unit 2090 carries out the k-nearest neighbor search by using the coordinates of the node obtained in the above described manner. Regarding specific processes of the k-nearest neighbor search, the methods described in Editorial input on G-PCC draft text, ISO/IEC, JTC1/SC29/WG11, m51806 and G-PCC codec description V5, ISO/IEC, JTC1/SC29/WG11, N18891 can be applied.

After the k-nearest neighbor search is carried out for all the nodes, the present process proceeds to step S1204 and is terminated.

Further, the point-cloud encoding device 100 and the point-cloud decoding device 200 may be realized as a program causing a computer to execute each function (each step).

Note that the above described embodiments have been described by taking application of the present invention to the point-cloud encoding device 10 and the point-cloud decoding device 30 as examples. However, the present invention is not limited only thereto, but can be similarly applied to an encoding/decoding system having functions of the encoding device 10 and the decoding device 30.

What is claimed is:

1. A point-cloud decoding device comprising:
    a geometry information decoder that decodes a flag that controls whether to apply a method in which octree, quadtree, and binary tree division is adaptively carried out or not; and
    an attribute-information decoder that decodes a flag that controls whether to apply "scalable lifting" or not; wherein,
    a restriction is set not to apply the "scalable lifting" when the method is applied.

2. The point-cloud decoding device according to claim 1, wherein "Octree" is applied when the "scalable lifting" is applied.

3. A point-cloud decoding method comprising:
    decoding a flag that controls whether to apply a method in which octree, quadtree, and binary tree division is adaptively carried out or not; and
    decoding a flag that controls whether to apply "scalable lifting" or not; wherein,
    a restriction is set not to apply the "scalable lifting" when the method is applied.

4. A program stored on a non-transitory computer-readable medium that causes a point-cloud decoding device to execute:
    decoding a flag that controls whether to apply a method in which octree, quadtree, and binary tree division is adaptively carried out or not; and
    decoding a flag that controls whether to apply "scalable lifting" or not; wherein,
    a restriction is set not to apply the "scalable lifting" when the method is applied.

* * * * *